Patented May 28, 1929.

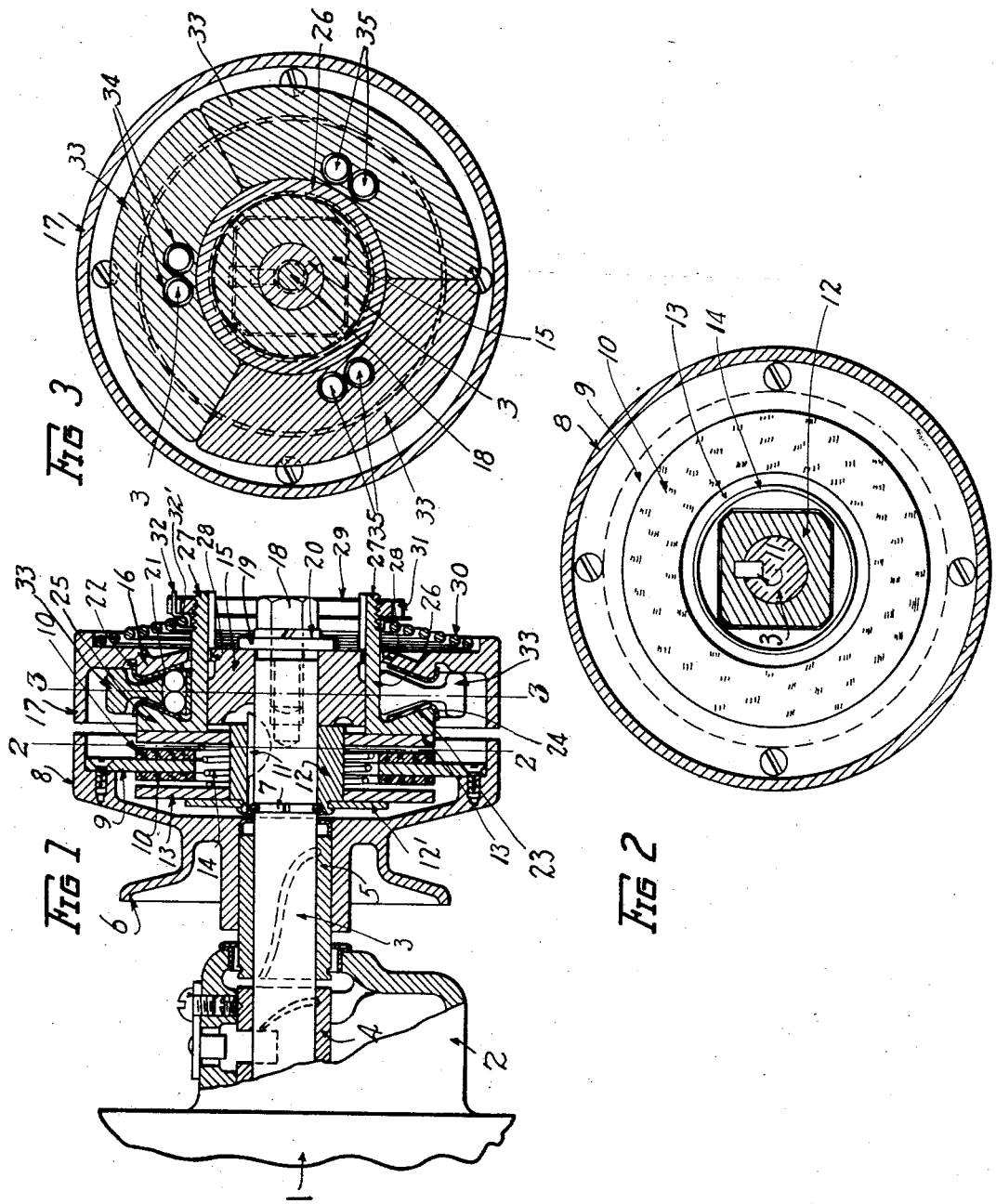

1,714,748

UNITED STATES PATENT OFFICE.

EDWIN M. WRIGHT, OF SPRINGFIELD, OHIO, ASSIGNOR, BY MESNE ASSIGNMENTS, TO ROBBINS & MYERS, INC., OF SPRINGFIELD, OHIO, A CORPORATION OF OHIO.

CLUTCH.

Application filed September 2, 1927. Serial No. 217,269.

My invention relates to a centrifugally operated clutch. The object of my invention is to provide a clutch of the character described which will be simple in construction, economical in manufacture and effective in operation.

In the accompanying drawings:

Fig. 1 is a longitudinal section of a clutch embodying my improvements shown applied to a shaft of an electric motor.

Fig. 2 is a section on the line 2—2 of Fig. 1.

Fig. 3 is a section on the line 3—3 of Fig. 1.

Referring to the drawings, 1 represents a portion of the casing of an electric motor, 2 the bearing housing and 3 the motor shaft which is journaled in a suitable bearing sleeve or bushing 4 supported by the housing, the shaft being extended outwardly beyond the housing. Journaled loosely upon the shaft adjacent the housing is a bushing 5 of a driven member, shown in the present case as a pulley 6, the pulley and its bushing being permitted a limited axial movement on the shaft.

The pulley has a laterally extending peripheral flange 8 having an inner annular shoulder to which is secured an annular ring 9 forming one member of a clutch, both sides of this ring being preferably faced with rings of cork 10 or other suitable material.

Keyed to the shaft by a key 11 is a sleeve 12 square in cross section, this sleeve being confined against axial movement in one direction by a ring 7 located in a groove in the shaft. Loosely mounted upon this sleeve is a pair of disks 13, each disk having a square opening fitted to the sleeve so as to rotate therewith; the inner end of the sleeve having secured thereto a disk 12' to act as an abutment or stop. These disks are maintained normally separated by a coil spring 14 placed between the same, and the ring 9 and its cork faces occupy a position between the disks.

Also mounted upon the shaft to rotate therewith is a member consisting of a hub portion 15, web portion 16 and overhanging rim 17. The hub is clamped against the sleeve 12 by a cap screw 18 threaded in the shaft and a washer 19, a lock washer 20 being also preferably employed. The web 16 is provided with an inclined surface 21 preferably faced with a hardened ring 22 which cooperates with an inclined surface 23 faced with a hardened ring 24 formed on an annular flange 25 at one end of a sleeve 26. This sleeve is mounted for axial movement upon the hub 15 and has prongs or extensions 27 which project through openings 28 in the web and are externally threaded to receive a nut 29. A coil spring 30 is interposed between the web 16 and the nut, the nut having notches 31 on its periphery to receive lugs 32 formed on the periphery of a sheet metal washer 32' which has its inner edge bent to form a seat for the inner coil of the spring 30, and also has integral lugs (not shown) which extend between the prongs 27; this washer serving to hold the nut in different positions of adjustment. The inclined faces of the web and flange cooperate to provide an outwardly converged annular pocket.

Mounted in the annular pocket formed by the inclined faces of the web and flange is a series of weights 33 of segmental form, the inner web of each of which is preferably tapered. The inner portion of the web of each weight has a pair of pockets 34 extending entirely through the same in a transverse direction and located in each pocket is a pair of balls 35 which cooperate with the inclined faces of the flange and web, the weights being held frictionally between these parts so as to revolve therewith.

In operation, when the motor requires a predetermined speed the weights moving outwardly by centrifugal force move the flange 25 axially against the tension of the spring 30 and press into driving engagement the cork faced ring 9 and disks 13 to rotate the pulley. As the weights move inwardly upon decreased speed of the motor, the spring 30 returns the flange to inoperative position to disengage the clutch members; the spring 14 tending to separate the disks 13 a sufficient distance to prevent dragging.

Having thus described my invention, I claim:

1. In a clutch, a driving shaft, a driven element loosely mounted on said shaft, a clutch between the same, a plurality of centrifugally operated weights rotatable with said driving shaft, an axially movable member on one side of said weights, a member fixed against axial movement on the opposite side of said weights, one at least of said members having an inclined surface adjacent said weights, said axially movable member having a plurality of threaded projections extending through the immovable member, a nut threaded on said projections, and a spring between said nut and said immovable member, said axially movable member being arranged to engage said clutch when moved by said weights.

2. In a clutch, a driving shaft, a driven element loosely mounted on said shaft, a clutch between said shaft and driven element, a member having an inclined surface mounted to rotate with said shaft but confined against axial movement thereon, a second inclined axially movable member forming with said other member an annular outwardly converged pocket, a plurality of weights having inclined surfaces mounted in said pocket, said axially movable member having a plurality of projecting prongs projecting through said other inclined member, said prongs being externally threaded, a nut threaded on said prongs, and a spring between said nut and said immovable member, said axially movable member being operable by said weights to engage said clutch and movable by said spring to disengage said clutch.

3. The combination of a motor shaft, a sleeve on said shaft to rotate therewith having an abutment at one end thereof, a driven member loosely mounted on said shaft having an annular part overhanging said sleeve, a clutch ring secured to said overhanging part encircling said sleeve, disks connected with said sleeve embracing said ring, an axially movable member mounted to rotate with said shaft at the opposite end of said sleeve from said abutment, another member opposed to said axially movable member mounted to rotate with said shaft, one at least of the adjacent faces of said members having an inclined face, and a plurality of inclined weights between said members free to move outwardly by centrifugal force.

4. The combination of a motor shaft, a sleeve mounted on said shaft to rotate therewith, a driven member loosely mounted on said shaft having an annular part overhanging said sleeve, a clutch ring carried by said overhanging part encircling said sleeve, disks connected with said sleeve embracing said ring, a member mounted to rotate with said shaft and held against axial movement thereon, an axially movable member supported by said first mentioned member, said members having opposed faces one at least of which is inclined, and a plurality of inclined weights between said members free to move outwardly by centrifugal force, said axially movable member being arranged to cooperate with said disks and ring to bring the same into and out of driving relation.

5. The combination of a motor shaft, a sleeve mounted on said shaft to rotate therewith, a driven member loosely mounted on said shaft having an annular part overhanging said sleeve, a clutch ring carried by said overhanging part encircling said sleeve, disks connected with said sleeve embracing said ring, a member mounted to rotate with said shaft and held against axial movement thereon, an axially movable member supported by said first mentioned member, said members having opposed faces one at least of which is inclined, and a plurality of inclined weights between said members free to move outwardly by centrifugal force, said axially movable member being arranged to cooperate with said disks and ring to bring the same into and out of driving relation, and a coil spring arranged between said members, together with means for adjusting the tension of said spring.

6. The combination of a motor shaft, a member mounted on said shaft so as to rotate therewith having a web portion, a second member slidably carried by said first member and having parts projecting through the web of said first member, said parts being threaded, a nut threaded on said parts, a coil spring between said nut and the web of said first member, said members having opposed faces one at least of which is inclined, and inclined weights between said faces.

In testimony whereof I have hereunto set my hand this 29th day of August, 1927.

EDWIN M. WRIGHT.